(12) United States Patent
Cheung et al.

(10) Patent No.: US 9,641,798 B2
(45) Date of Patent: May 2, 2017

(54) VERY LARGE CONFERENCE SPANNING MULTIPLE MEDIA SERVERS IN CASCADING ARRANGEMENT

(75) Inventors: Eric Cheung, New York, NY (US); Gerald Michael Karam, Morristown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1184 days.

(21) Appl. No.: 12/565,931

(22) Filed: Sep. 24, 2009

(65) Prior Publication Data
US 2011/0072087 A1 Mar. 24, 2011

(51) Int. Cl.
G06F 15/16 (2006.01)
H04N 7/15 (2006.01)
H04L 12/18 (2006.01)
H04N 7/14 (2006.01)
H04L 29/06 (2006.01)

(52) U.S. Cl.
CPC .......... *H04N 7/15* (2013.01); *H04L 12/1822* (2013.01); *H04L 12/18* (2013.01); *H04L 12/1818* (2013.01); *H04L 65/1069* (2013.01); *H04L 65/403* (2013.01); *H04N 7/147* (2013.01); *H04N 7/152* (2013.01)

(58) Field of Classification Search
CPC ..... H04L 12/16; H04L 12/1813; H04L 12/18; H04L 12/1822; H04L 12/1877; H04L 29/06176; H04L 29/06027; H04L 29/06414; H04L 12/1818; H04L 65/403; H04L 65/1069

USPC ......................................... 709/205
See application file for complete search history.

(56) References Cited

U.S. PATENT DOCUMENTS

| 6,888,925 | B2 | 5/2005 | Spitzer et al. |
| 7,113,993 | B1 | 9/2006 | Cappiello et al. |
| 2005/0135583 | A1* | 6/2005 | Kardos ................. 379/142.01 |
| 2005/0207357 | A1* | 9/2005 | Koga ......................... 370/260 |
| 2008/0016156 | A1 | 1/2008 | Miceli et al. |
| 2008/0082609 | A1* | 4/2008 | O'Sullivan et al. ........ 709/204 |
| 2010/0185956 | A1* | 7/2010 | Anantharaman ..... H04L 65/403 715/753 |
| 2010/0228824 | A1* | 9/2010 | Lin et al. ..................... 709/204 |
| 2011/0158233 | A1* | 6/2011 | Namgung .................... 370/390 |
| 2013/0335515 | A1* | 12/2013 | Wamorkar ............ H04M 3/567 348/14.09 |

* cited by examiner

*Primary Examiner* — Tom Y Chang
(74) *Attorney, Agent, or Firm* — Greenblum & Bernstein, P.L.C.

(57) ABSTRACT

A communication method for transferring communication data between a plurality of participants is provided. The participants include at least one active participant that generates the communication data and at least one passive participant that does not generate the communication data. The communication method includes receiving, by a primary server, the communication data generated by the active participant and transmitting, by the primary server, the communication data received from the active participant to at least one secondary server that does not receive any communication data from any of the active participant and the at least one passive participant. The secondary server receives the communication data transmitted from the primary server and transmits the received communication data to the passive participant.

18 Claims, 6 Drawing Sheets

VERY LARGE CONFERENCE SPANNING MULTIPLE MEDIA SERVERS IN CASCADING ARRANGEMENT

BACKGROUND

1. Field of the Disclosure

The present disclosure relates generally to data transmission. More particularly, the present disclosure relates to data transmission to participants of large-scale conferences that exceed the capacity of a single media server.

2. Background Information

A conference links multiple participants over a network. Audio and multimedia conferencing is typically achieved by a network-based mixing media server. Such a media server generally combines audio streams from all participants to form a mixed audio stream. Such a media server may also combine video streams of all participants to form a mixed video stream by either reducing the size of the video streams and piecing them together in a matrix or by switching between the video streams to show only one participant at a time. The mixed audio stream and/or video stream is then transmitted from the media server to each of the participants. Presently, a media server has a finite capacity; generally in the order of one thousand participants. Thus, in order to support large-scale conferences that exceed the capacity of a single media server, multiple media servers must be utilized.

In such large-scale conferences, each participant is typically connected to one of several first tier media servers. Each of the first tier media servers combine the audio and/or video streams of each of the participants connected thereto to form a partial mixed audio and/or video stream. Thereafter, a second tier media server combines the partial mixed audio and/or video streams formed by each of the first tier media servers to form a universal mixed audio and/or video stream. The second tier media server transmits the universal mixed audio and/or video stream to each of the first tier media servers, and the first tier media servers then transmit the universal mixed audio and/or video stream to each of the participants.

DETAILED DESCRIPTION

Figure 1:
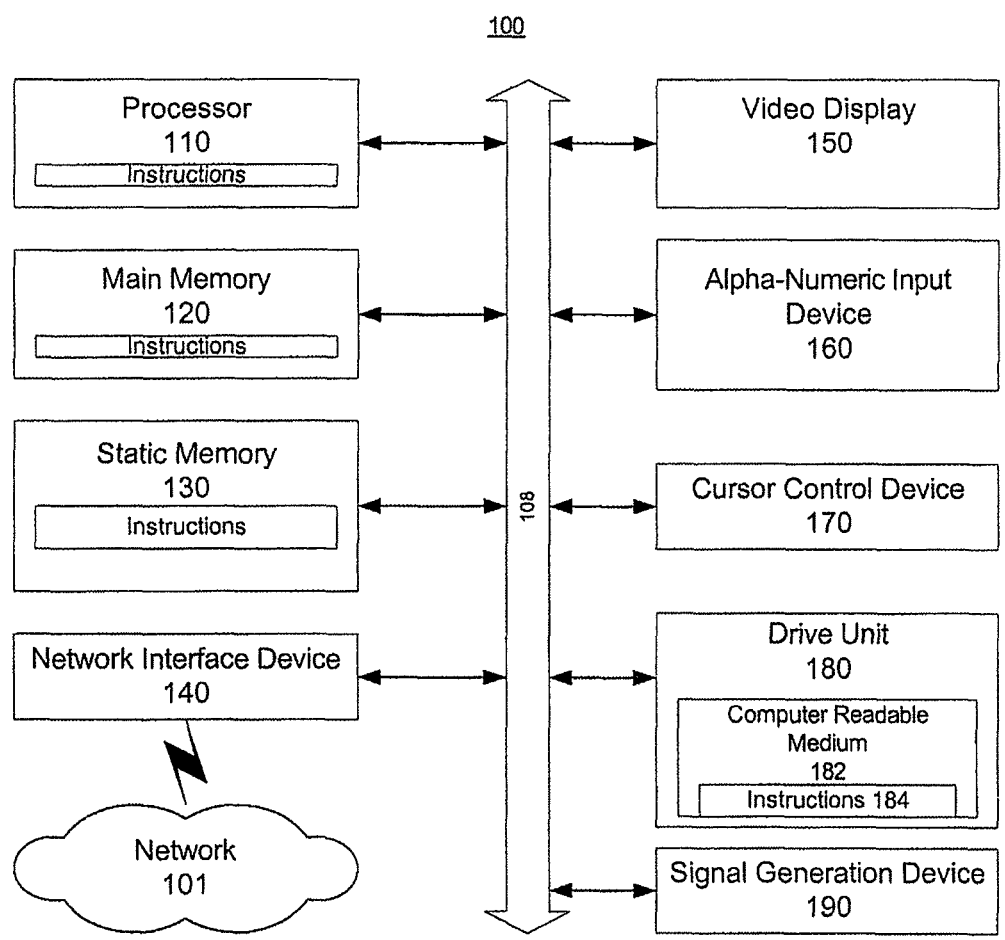
FIG. 1 shows an exemplary general computer system that includes a set of instructions for transferring communication data between a plurality of participants.

In view of the foregoing, the present disclosure, through one or more of its various aspects, embodiments and/or specific features or sub-components, is thus intended to bring out one or more of the advantages as specifically noted below.

According to an embodiment of the present disclosure, a communication method for transferring communication data between a plurality of participants, the participants including at least one active participant that generates the communication data and at least one passive participant that does not generate the communication data, includes: receiving, by a primary server, the communication data generated by the active participant; and transmitting, by the primary server, the communication data received from the active participant to at least one secondary server that does not receive any communication data from any of the active participant and the at least one passive participant, wherein the secondary server receives the communication data transmitted from the primary server and transmits the received communication data to the passive participant.

According to one aspect of the present disclosure, the primary server does not receive any communication data from the at least one secondary server.

According to another aspect of the present disclosure, the method further includes establishing a primary communication session between the primary server and the active participant for the receiving, by the primary server, the communication data generated by the active participant. Furthermore, a secondary communication session is established between the secondary server and the passive participant for transmitting the communication data from the secondary server to the passive participant.

According to yet another aspect of the present disclosure, the method further includes: receiving, by the primary server, a request from the passive participant to establish the primary communication session; and establishing, by the primary server, the primary communication session with the requesting passive participant in response to receiving the request, whereby the requesting passive participant becomes another one of the active participants.

According to still another aspect of the present disclosure, the method includes: detecting, by one of the primary server and the secondary server, a signal from the passive participant to establish the primary communication session; and establishing, by the primary server, the primary communication session with the signaling passive participant in response to detecting the signal, whereby the signaling passive participant becomes another one of the active participants.

According to an additional aspect of the present disclosure, when the primary server establishes the primary communication session with the signaling passive participant, the secondary communication session between the secondary server and the signaling passive participant is terminated.

According to another aspect of the present disclosure, the method includes: terminating the primary communication session between the active participant and the primary server in response to a predetermined event, wherein the secondary communication session is established between the secondary server and the active participant in response to the terminating of the primary communication session between the active participant and the primary server, whereby the active participant becomes another one of the passive participants.

According to yet another aspect of the present disclosure, the primary communication session and the secondary communication session are established via session initiation protocol.

According to still another aspect of the present disclosure, an application server receives a request from the passive participant to establish the primary communication session, the application server establishes the primary communication session with the requesting passive participant in response to receiving the request, whereby the requesting passive participant becomes another one of the active participants, and the application server signals the requesting passive participant and the primary server to indicate the establishment of the primary communication session with the requesting passive participant. According to such an aspect, the primary server and the secondary server are media servers.

According to an additional aspect of the present disclosure, the primary server receives communication data generated by a plurality of active participants, and the primary server mixes the communication data received from the plurality of active participants before transmitting the communication data to the secondary server.

According to another aspect of the present disclosure, the secondary server transmits the communication data received from the primary server to the active participant.

According to another embodiment of the present disclosure, a primary server for transferring communication data between a plurality of participants, the participants including at least one active participant that generates the communication data and at least one passive participant that does not generate the communication data, includes: a data receiver that receives the communication data generated by the active participant; and a data transmitter that transmits the communication data received from the active participant to at least one secondary server that does not receive any communication data from any of the active participant and the at least one passive participant, wherein the secondary server receives the communication data from the data transmitter and transmits the communication data to the passive participant.

According to one aspect of the present disclosure, the primary server further includes a communication session initiator that establishes a primary communication session with the active participant for receiving the communication data generated by the active participant. Furthermore, the secondary server establishes a secondary communication session with the passive participant for transmitting the communication data to the passive participant.

According to an additional aspect of the present disclosure, the primary server further includes a request receiver that receives a request from the passive participant to establish the primary communication session, the request being received via an out-of-band communication. According to such an aspect, the communication session initiator establishes the primary communication session with the requesting passive participant in response to the request receiver receiving the request, whereby the passive participant is another one of the active participants.

According to another aspect of the present disclosure, one of a signal detector of the primary server and the secondary server detects a signal from the passive participant to establish the primary communication session, and the communication session initiator establishes the primary communication session with the signaling passive participant in response to the one of the signal detector and the secondary server detecting the signal, whereby the passive participant is another one of the active participants.

According to yet another aspect of the present disclosure, the primary server receives the communication data generated by a plurality of the active participants, and the primary server further comprises a data mixer that mixes the communication data received from the plurality of active participants before the data transmitter transmits the communication data to the secondary server.

According to still another aspect of the present disclosure, the secondary server transmits the communication data received from the primary server to the active participant.

According to another embodiment of the present disclosure, a tangible computer-readable medium encoded with an executable computer program for transferring communication data between a plurality of participants, the participants including at least one active participant that generates the communication data and at least one passive participant that does not generate the communication data, includes: a primary communication session code segment that establishes a primary communication session between a primary server and the active participant; a data receiving code segment that receives, at the primary server, the communication data generated by the active participant via the primary communication session; and a data transmitting code segment that transmits, from the primary server, the communication data received from the active participant to a secondary server. According to such an embodiment, a secondary communication session is established between the secondary server and the passive participant, the communication data received by the secondary server from the primary server is transmitted to the passive participant via the secondary communication session, the primary server does not receive any communication data from the secondary server, and the secondary server does not receive any communication data from any of the active participant and the at least one passive participant.

According to one aspect of the present disclosure, the tangible computer-readable medium further includes a request receiving code segment that receives, at the primary server, a request from the passive participant to establish the primary communication session. In this regard, the primary communication session code segment establishes the primary communication session between the primary server and the requesting passive participant in response to the request receiving code segment receiving the request.

According to another aspect of the present disclosure, the tangible computer-readable medium further includes a detecting code segment that detects, at the primary server, a signal from the passive participant to establish the primary communication session. In this regard, he primary communication session code segment establishes the primary communication session between the primary server and the signaling passive participant in response to the detecting code segment detecting the signal.

FIG. 1 is an illustrative embodiment of a general computer system, on which a method a very large conference spanning multiple media servers in cascading arrangement can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
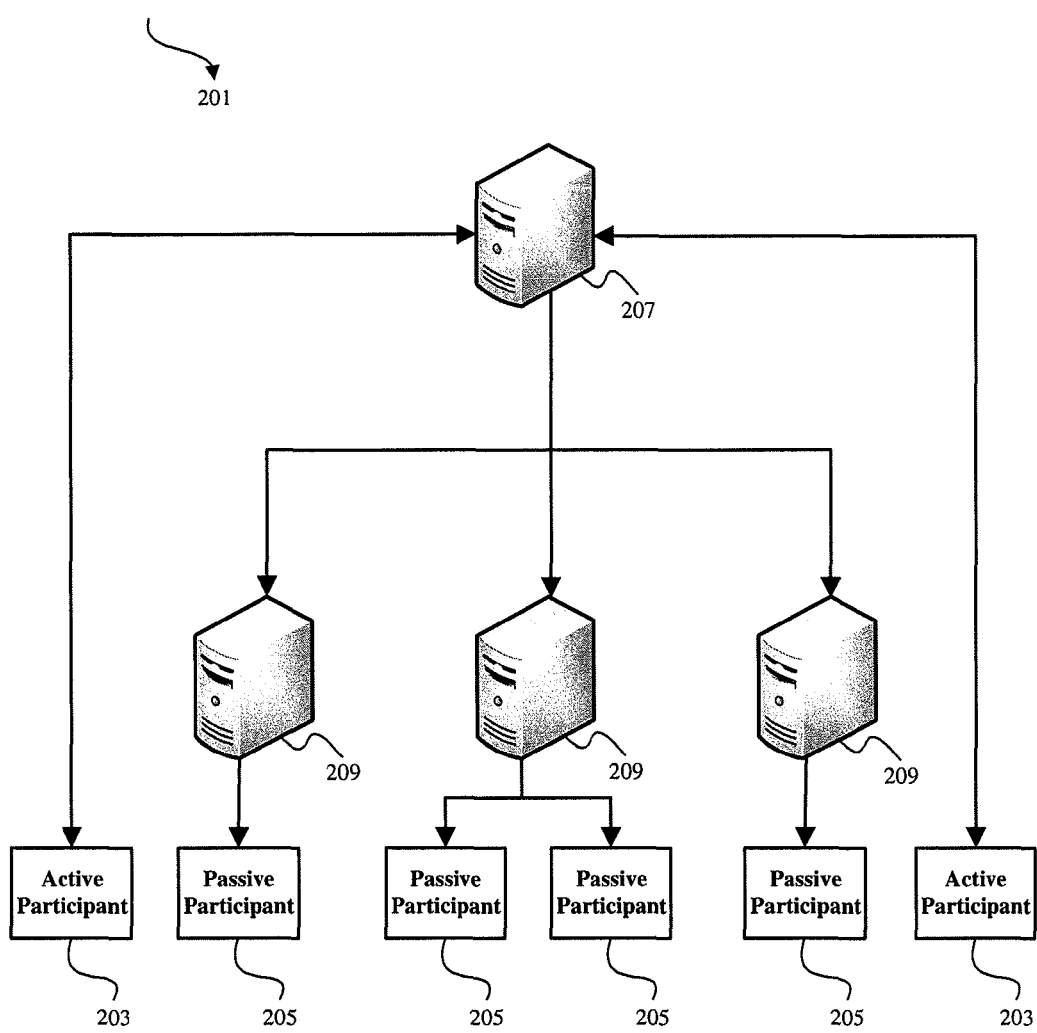
FIG. 2 is a schematic of an embodiment of a communication system for transferring communication data between a plurality of participants.

A communication system 201 for transferring communication data between a plurality of participants is generally shown in FIG. 2. The communication system 201 includes a plurality of participants comprising at least one active participant 203 that generates communication data and at least one passive participant 205 that does not generate communication data. In other words, the active participant 203 is actively participating in a communication session while the passive participant 205 is not actively participating. For example, in a non-limiting and exemplary embodiment of the communication system 201, the active participant 203 and the passive participant 205 are each participating in a teleconference. In the non-limiting and exemplary embodiment, the active participant 203 may be providing communication data, such as an audio stream, by speaking while the passive participant 205 is not speaking, but rather, merely receives the audio stream generated by the active participant 203. The at least one active participant 203 and the at least one passive participant 205 are referred to, hereinafter, as active participants 203 and passive participants 205, respectively. However, those skilled in the art appreciate that the communication system 201 may include a single active participant 203 and/or a single passive participant 205.

The communication data generated by the active participants 203 may include any media such as, but not limited to, an audio stream or a video stream or any other type of data such as, but not limited to, whiteboard data and application sharing data. Those skilled in the art appreciate that the communication data may include any other media or data commonly known in the art. Additionally, those skilled in the art further appreciate that the communication data may comprise a combination of types of data, such as, for example, a video and audio stream.

The communication system 201 includes a primary server 207 that receives the communication data generated by the active participants 203. Generally, a primary communication session is established between the primary server 207 and each of the active participants 203 for receiving, by the primary server 207, the communication data generated by the active participants 203. The primary communication session may be established via session initiation protocol (SIP) or any other protocol commonly known or understood in the art.

The primary server 207 may mix the communication data received from each of the active participants 203 to form mixed communication data. The primary server 207 may be a media server, or any other type of server commonly known in the art.

The primary server 207 transmits the communication data that is received from the active participants 203 to at least one secondary server 209 that does not receive any communication data from the active participants 203 or receive communication data from any of the passive participants 205. The at least one secondary server 209 is referred to, hereinafter, as secondary servers 209. However, those skilled in the art appreciate that the communication system 201 may include a single secondary server 209.

The secondary servers 209 receive the communication data from the primary server 207 and transmit the communication data to the passive participants 205. Generally, a secondary communication session is established between one of the secondary servers 209 and each of the passive participants 205 for transmitting, by the secondary servers 209, the communication data that is received by the secondary servers 209 to the passive participants 205. The secondary communication session may be established via SIP or any other protocol commonly known or understood in the art.

Accordingly, in the communication system 201 as shown in FIG. 2, the primary server 207 receives the communication data from the active participants 203, mixes the communication data, and transmits the mixed communication data to the secondary servers 209. Thereafter, the secondary servers 209 transmit the mixed communication data to the passive participants 205. In this regard, in an exemplary communication system such as a teleconference, typically only a small number of participants are actively speaking. Thus, the communication system 201 as shown in FIG. 2 modifies whether a participant is connected to the primary server 207 as one of the active participants 203 or whether a participant is connected to one of the secondary servers 209 as one of the passive participants 205.

For example, in the communication system 201 as shown in FIG. 2, the primary communication session that was established between one of the active participants 203 and the primary server 207 may be terminated in response to a predetermined event. The predetermined event may be, but is not limited to: a moderator indicating that one of the active participants 203 no longer has permission to provide communication data; a request provided by one of the active participants 203; a signal detected by the primary server 207, one of the secondary servers 209, or an application server 411; or a predetermined condition, such as one of the active participants 203 not providing communication data for a predetermined period of time. In response to terminating the primary communication session between one of the active participants 203 and the primary server 207, a secondary communication session is established between one of the secondary servers 209 and the active participant 203 whose primary communication session was terminated. In this regard, the active participant 203 whose primary communication session was terminated becomes another one of the passive participants 205, and thus, is unable to transmit communication data to the primary server 207.

In addition to the above, in an embodiment of the communication system 201, the primary server 207 may receive a request from one of the passive participants 205 to establish a primary communication session. The request may be received by the primary server 201 via any out-of-band communication mean that is commonly known or understood in the art. In response to receiving the request, the primary server 207 establishes a primary communication session with the requesting one of the passive participants 209. In this regard, the requesting one of the passive participants 209 becomes another one of the active participants 203, and thus, is able to transmit communication data to the primary server 207.

In an alternative embodiment of the communication system 201, either the primary server 207 or one of the secondary servers 209 may detect a signal from one of the passive participants 205 to establish a primary communication session with the primary server 207. The signal may be, for example, a dual-tone multi-frequency signal, an audible signal, or any other type of signal commonly known in the art. In response to detecting the signal, either the primary server 207 or one of the secondary servers 209 may automatically establish a primary communication session between the primary server 207 and the signaling one of the passive participants 205. In this regard, the signaling one of the passive participants 205 becomes another one of the active participants 203, and thus, is able to transmit communication data to the primary server 207.

In the above described embodiments, wherein one of the passive participants 205 becomes another one of the active participants 203, in response to establishing the primary communication session between the primary server 207 and the signaling or requesting one of the passive participants 205, the secondary communication session that was established between the signaling or requesting one of the passive participants 205 and one of the secondary servers 209 is terminated. In other words, when one of the passive participants 205 becomes another one of the active participants 203, the passive participant 205 is only connected to the primary server 203 via a primary communication session and is not connected to one of the secondary servers 209 via a secondary communication session. According to such an embodiment, as shown in FIG. 2, each of the active participants 203 receives the communication data from the primary server 207.

Figure 3:
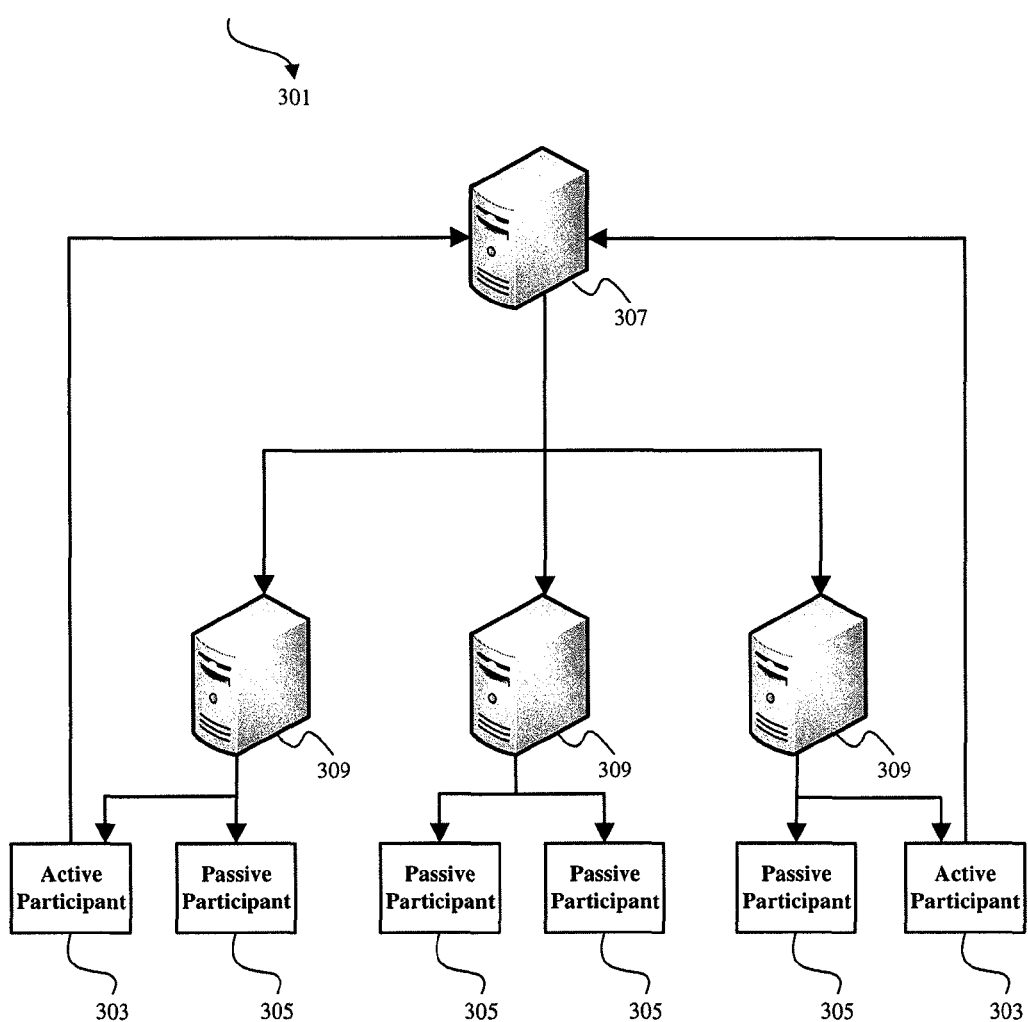
FIG. 3 is a schematic of an additional embodiment of a communication system for transferring communication data between a plurality of participants.

In an alternative embodiment, in the communication system 301 as shown in FIG. 3, when one of the passive participants 305 becomes another one of the active participants 303, the secondary communication session that was established between the passive participant 305 that becomes another one of the active participants 303 and one of the secondary servers 309 is not terminated. In this regard, each of the active participants 303 is connected to the primary server 307 via a primary communication session and connected to the secondary server 309 via a secondary communication session. According to such an embodiment, each of the active participants transmits communication data to the primary server 307. The primary server 307 transmits the communication data to the secondary servers 309, the secondary servers 309 receive the communication data from the primary server 307, and the secondary servers 309 transmit the communication data to the active participants 303 and to the passive participants 305.

Figure 4:
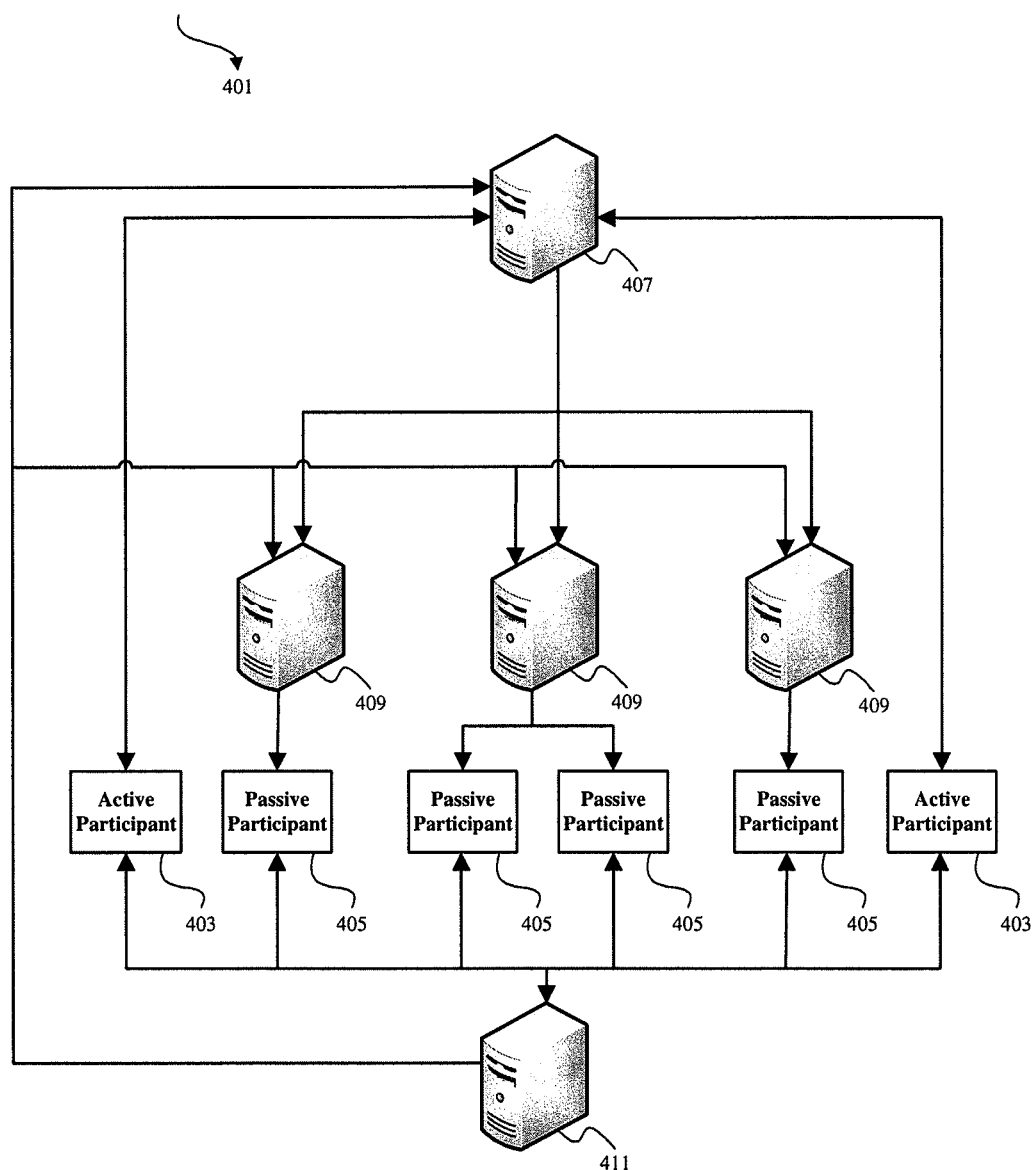
FIG. 4 is a schematic of a further embodiment of a communication system for transferring communication data between a plurality of participants that includes an application server.

In the communication system 401 as shown in FIG. 4, the communication system 401 is provided for transferring communication data between a plurality of participants. The participants comprise active participants 403 that generate communication data and passive participants 405 that do not generate the communication data. A primary server 407 receives the communication data generated by the active participants 407 and transmits the communication data to secondary servers 409. The secondary servers 409 do not receive any communication data from either the active participants 403 or the passive participants 405, but rather, transmit the communication data received from the primary server 407 to the passive participants 405.

In the communication system 401 as shown in FIG. 4, each of the active participants 403 and the passive participants 405 is in communication with an application server 411. In an embodiment of the communication system 401, the application server detects signals of the active participants 403 and the passive participants 405 for determining whether to initiate a primary communication session between each participant 403, 405 and the primary server 407 or a secondary communication session between each participant 403, 405 and one of the secondary servers 409. In an alternative embodiment of the communication system 401, the application server 411 receives requests from the active participants 403 and the passive participants 405 for determining whether to initiate a primary communication session or a secondary communication session. In response to detecting a signal or receiving a request from one of the active participants 403 or the passive participants 405, the application server 411 signals the requesting or signaling one of the active participants 403 or the passive participants 405 and signals at least one of the primary server 407 and one of the secondary servers 409 to indicate the establishment of a primary communication session or a secondary communication session.

In the communication system 401, the application server 411 may establish primary communication sessions and secondary communication sessions via SIP. For example, the signaling messages that may be transmitted between the application server 411 and the active participants 403, the passive participants 405, the primary server 407, and the secondary servers 409 may include, at least, mid-CALL, re-INVITE, or REFER requests. However, those skilled in the art appreciate that additional signaling messages and/or additional signaling protocols may also be used.

In an embodiment of the communication system 401, the primary server 407 and the secondary servers 409 are media servers. Furthermore, the primary server 407 may perform mixing of the communication data received from the active participants 403.

The exemplary and non-limiting communication systems as set forth herein provide for a primary server that transfers communication data between a plurality of participants in a communications systems. In an embodiment of the present disclosure, the primary server includes a data receiver that receives the communication data generated by the active participant, and a data transmitter that transmits the communication data received from the active participant to at least one secondary server that does not receive any communication data from any of the active participant and the at least one passive participant. According to such an embodiment, the secondary server receives the communication data from the data transmitter and transmits the communication data to the passive participant.

According to an embodiment of the primary server, the primary server further includes a communication session initiator that establishes a primary communication session with the active participant for receiving the communication data generated by the active participant. In this regard, the secondary server may establish a secondary communication session with the passive participant for transmitting the communication data to the passive participant. The primary server may also include a request receiver that receives a request from the passive participant to establish the primary communication session, the request being received via an out-of-band communication. In this regard, the communication session initiator may establish the primary communication session with the requesting passive participant in response to the request receiver receiving the request, whereby the passive participant is another one of the active participants.

According to a further embodiment of the primary server, the primary server includes a signal detector, wherein one of the signal detector of the primary server and the secondary server detects a signal from the passive participant to establish the primary communication session. In such an embodiment, the communication session initiator may establish the primary communication session with the signaling passive participant in response to the one of the signal detector and the secondary server detecting the signal, whereby the passive participant is another one of the active participants.

In an even further embodiment of the primary server, wherein the data receiver of the primary server receives the communication data generated by a plurality of the active participants, the primary server further includes a data mixer that mixes the communication data received from the plurality of active participants before the data transmitter transmits the communication data to the secondary server.

Figure 5:
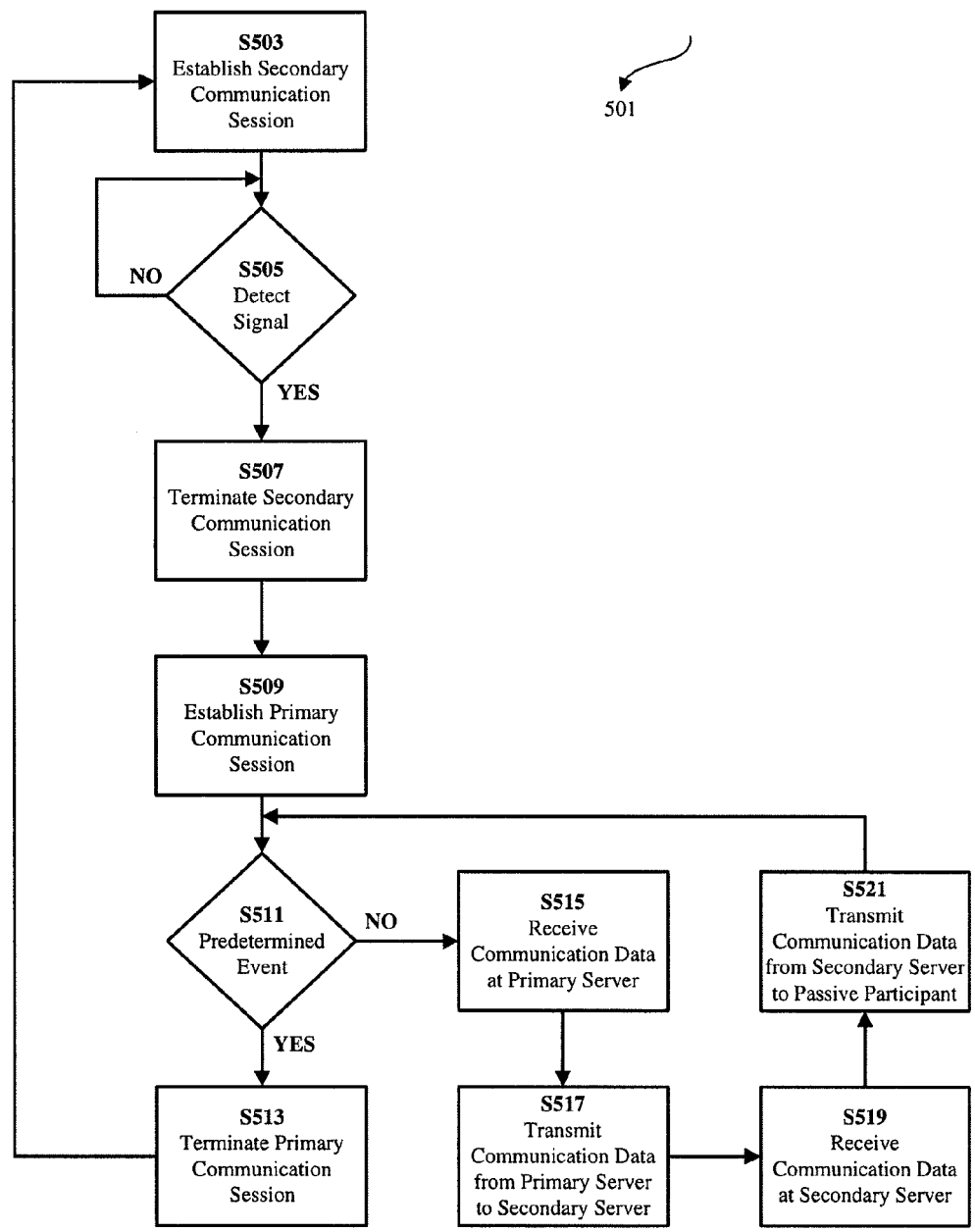
FIG. 5 is a flowchart of an embodiment of a communication method for transferring communication data between a plurality of participants.

In another embodiment of the present disclosure, as generally shown in FIG. 5, a communication method 501 for transferring communication data between a plurality of participants is provided. The participants include at least one active participant that generates communication data and at least one passive participant that does not generate communication data. For example, in a non-limiting and exemplary embodiment of the communication method, an audio stream is transferred between the active participant and the passive participant in a teleconference. In the non-limiting and exemplary embodiment, the active participant generates the audio stream by speaking while the passive participant does not speak, but rather, merely receives the audio stream generated by the active participant. The at least one active participant and the at least one passive participant are referred to, hereinafter, as active participants and passive participants, respectively. However, those skilled in the art appreciate that the communication method may include a single active participant or a single passive participant.

In the communication method 501, a secondary communication session is established between each of the passive participants and one of at least one secondary server S503. The at least one secondary server is referred to, hereinafter, as secondary servers. However, those skilled in the art appreciate that the communication method 501 may include a single secondary server.

Thereafter, a primary server, one of the secondary servers, or an application server detects a signal from one of the passive participants to establish a primary communication session with the primary server S505. The signal may be any commonly known signal, such as, but not limited to, a dual-tone multi-frequency signal or an audible signal.

As shown in FIG. 5, in response to the signal from one of the passive participants being detected S505, a secondary communication session between the signaling passive participant and one of the secondary servers is terminated S507. The secondary communication session may be terminated by either the application server or one of the secondary servers.

Furthermore, also in response to the signal from one of the passive participants being detected S505, a primary communication session is established between the signaling passive participant and the primary server S509. In this regard, the signaling passive participant becomes another one of the active participants, and thus, is able to generate the communication data. The primary communication session may be established by either the application server or the primary server. In an embodiment of the communication method 501 wherein the application server establishes the primary communication session, the application server may send a signal to the primary server and the signaling passive server to confirm that the primary communication session was established.

The communication method 501, as shown in FIG. 5, further determines whether a predetermined event regarding one of the active participants occurs S511. The primary server may determine whether the predetermined even has occurred, or alternatively, the application server may determine whether the predetermined event has occurred. The predetermined event may be a signal generated by one of the active participants, a request received from one of the active participants, or a condition, such as, but not limited to, one of the active participants being inactive for a predetermined period of time. For example, in a non-limiting and exemplary embodiment of the communication method 501 in which the participants are participating in a teleconference, the predetermined event may be one of the active participants failing to provide communication data, such as an audio stream, for a predetermined period of time.

According to the communication method 501, when it is determined that the predetermined event regarding one of the active participants has occurred S511, then the primary communication session is terminated S513 and the secondary communication session is established between the active participant and one of the secondary servers S503. In this regard, the active participant switches from being an active participant that can generate communication data to a passive participant that cannot generate communication data.

If the predetermined event has not occurred, then the active participant can generate communication data. In other words, each of the active participants can generate communication data. For example, the active participants can each generate an audio stream or a video stream as communication data. The communication data generated by the active participants is received by the primary server S515. In this regard, the primary server only receives communication data generated by the active participants and does not receive communication data from the secondary servers or communication data generated by the passive participants. In an embodiment of the communication method 501, wherein the primary server receives the communication data from a plurality of active participants, the primary server may mix the communication data to create mixed communication data. For example, the primary server may combine an audio stream generated by each of the active participants. Additionally, or alternatively, the primary server may combine a video stream generated by each of the active participants by either piecing them together in a matrix or by switching between the video streams to show only one of the active participants at a time. In such an embodiment of the communication method, the primary server may be a media server.

As shown in FIG. 5, the communication data, or the mixed communication data, is transmitted from the primary server to the secondary servers S517, and the secondary servers receive the communication data transmitted from the primary server S519. In this regard, the secondary servers only receive the communication data from the primary server and do not receive communication data from the active participants or the passive participants. Thus, each of the secondary servers receive the same communication data and do not need to perform mixing of communication data.

The communication data received by the secondary servers from the primary server is transmitted to each of the passive participants S521. Accordingly, each of the passive participants receives the same communication data from the secondary servers.

Figure 6:
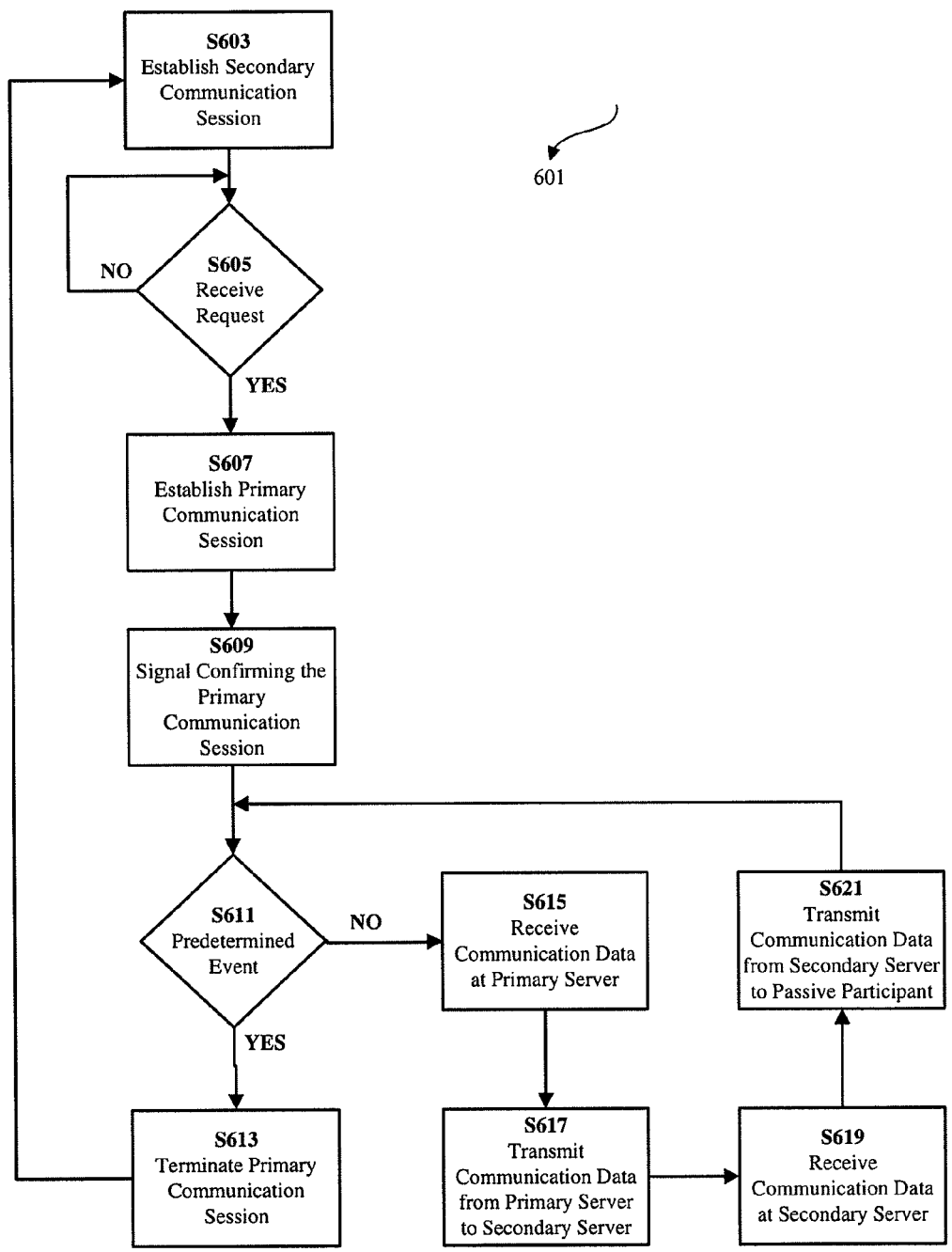
FIG. 6 is a flowchart of an additional embodiment of a method for transferring communication data between a plurality of participants.

An additional embodiment of a communication method 601 is generally shown in FIG. 6. The communication method 601 is generally similar to the communication method as shown in FIG. 5, except that a request is received from one of the passive participants to establish the primary communication session S605. The request may be received by the primary server or by the application server. The request may be received by the primary server or the application server via any commonly known out-of-band communication method. As shown in FIG. 6, in response to receiving the request from the passive participant to establish a primary communication session S605 and establishing the primary communication session between the primary server and the requesting passive participant 5607, a signal confirming that the primary communication session has been established may be sent to the primary server and/or the requesting passive participant S609. The signal may be sent from the primary server or the application server.

The present disclosure also provides a tangible computer-readable medium encoded with an executable computer program for transferring communication data between a plurality of participants. The participants include at least one active participant that generates the communication data and at least one passive participant that does not generate the communication data. The tangible computer-readable medium includes a primary communication session code segment that establishes a primary communication session between a primary server and the active participant. The tangible computer-readable medium may further include a secondary communication session code segment that establishes a secondary communication session between a secondary server and the passive participant The primary communication session code segment and the secondary communication session code segment may establish the primary communication session and the secondary communication session, respectively, via SIP or via any other protocol that is commonly known in the art.

The tangible computer-readable medium further includes a primary server code segment that causes the primary server to receive the communication data generated by the active participant via the primary communication session and to transmit the communication data received from the primary server to the secondary server. In an embodiment of the tangible computer-readable medium, wherein the primary server receives the communication data from a plurality of active participants, the primary server code segment may further cause the primary server to mix the communication data received from the plurality of active participants.

In an embodiment of the tangible computer-readable medium, the primary server code segment may comprise a data receiving code segment that receives, at the primary server, the communication data generated by the active participant via the primary communication session and a data transmitting code segment that transmits, from the primary server, the communication data received from the active participant to the secondary server.

In a further embodiment of the tangible computer-readable medium, the tangible computer-readable medium includes a secondary server code segment that causes the secondary server to receive the communication data from the primary server and to transmit the communication data received from the primary server to the passive participant via the secondary communication session.

When the executable computer program encoded on the tangible computer-readable medium is executed, the primary server does not receive any communication data from the secondary server or the passive participant. Furthermore, the secondary server does not receive any communication data from any of the active participant and the at least one passive participant. That is, all of the communication data is received by the primary server from the active participant and transmitted to the secondary server as a result of the primary server code segment.

In an embodiment of the tangible computer-readable medium, the tangible computer-readable medium further includes a request receiving code segment that receives a request from the passive participant to establish a primary communication session. In response to the request receiving code segment receiving the request from the passive participant, the primary communication session code segment establishes a primary communication session between the primary server and the requesting passive participant. In this regard, the requesting passive participant becomes another one of the active participants for causing the primary server code segment to cause the primary server to receive the communication data generated by the requesting passive participant. The request receiving code segment may receive the request from the passive participant via any signaling protocol commonly known in the art, such as, but not limited to, SIP.

In an alternative embodiment of the tangible computer-readable medium, a detecting code segment detects a signal from the passive participant to establish a primary communication session. In this regard, in response to the detecting code segment detecting the signal, the primary communication session code segment establishes a primary communication session between the primary server and the signaling passive participant, whereby the signaling passive participant becomes another one of the active participants. The detecting code segment may detect any commonly known signals, such as, but not limited to, dual-tone multi-frequency signals and audible signals.

In a further embodiment of the tangible computer-readable medium, in response to either the request receiving code segment receiving the request or the detecting code segment detecting the signal, a secondary communication termination code segment terminates the secondary communication session between either the requesting passive participant or the signaling passive participant in response to the primary communication session code segment establishing the primary communication session between either the requesting passive participant or the signaling passive participant and the primary server.

Accordingly, the present invention provides support for very large conferences that exceed the capacity of a single media server. In this regard, since at any given time only a small number of active participants are actively participating in the conference, a single primary server is capable of mixing all of the communication data generated by the active participants. The primary server transmits the mixed communication data to any number of secondary servers, which then transmit the mixed communication data to the passive participants. According to such a feature, the latency from an active participant to a passive participant is minimized. That is, the communication data needs to traverse only two servers.

Furthermore, in addition to the above, the primary server may also transmit the mixed communication data to the active participants. According to such a feature, the round-trip latency of the communication data amongst the active participants is minimized. That is, the communication data need only traverse a single server as in a normal, smaller conference. Such a feature avoids the problem of perceived non-responsiveness and over-talking caused by latency.

Additionally, since all active participants provide communication data to the same primary server, all of the communication data is provided in a fair and straightforward manner. For example, in a teleconference in which the active participants are each speaking, loudest speaker selection is fair and straightforward. Similarly reporting of the communication data to the active participants and the passive participants is also straightforward. In this regard, all active participants and passive participants receive the same communication data, regardless of which secondary server they are on.

In addition to the above, since the secondary servers do not need to perform mixing of the communication data, the secondary servers can be implemented much more efficiently. In this regard, the secondary servers may be able to support many more participants than a single server in a smaller conference. Also, the secondary servers may incur smaller latency as they do not need to perform mixing.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, although the communication system, communication method, and tangible computer-readable medium have been described with reference to a teleconference, it is to be understood that the communication system, communication method, and tangible computer-readable medium may be applied to other events, such as, but not limited to, video conferencing, streaming multimedia distribution, instant messaging, application sharing, and whiteboard applications.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other signaling protocols of communication systems represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A communication method for transferring communication data between a plurality of participants, the communication method comprising:
    establishing a primary communication session between a primary server and an active participant of the plurality of participants;
    receiving, by the primary server, communication data generated by the active participant of the plurality of participants;
    transmitting, by the primary server, the communication data received from the active participant to the active participant and to each of a plurality of secondary servers that is configured not to receive directly any communication data from the plurality of participants;
    determining whether a predetermined event has occurred, the predetermined event being the active participant not providing the communication data for a predetermined period of time;
    terminating the primary communication session between the primary server and the active participant and establishing a secondary communication session between one of the plurality of secondary servers and the active participant when the predetermined event occurs; and
    establishing the primary communication session between the primary server and a passive participant of the plurality of participants in response to the primary server receiving a request from the passive participant while the secondary communication session is established between the passive participant and one of the plurality of secondary servers, and terminating the secondary communication session between the passive participant and the one of the plurality of secondary servers in response to the primary communication session being established, the request being an out-of-band communication,
    wherein each of the plurality of secondary servers is configured to receive the communication data transmitted from the primary server, not perform mixing of the communication data, transmit the communication data to different ones of passive participants of the plurality of participants that do not generate any communication data, and not transmit the communication data to the active participant when the primary communication session is established between the primary server and the active participant, and
    an application server determines whether the predetermined event has occurred, the application server terminating the primary communication session and establishing the secondary communication session when the predetermined event occurs.

2. The communication method as set forth in claim 1, wherein the primary server and the plurality of secondary servers are interconnected via one-way communication, with the primary server being configured to not receive any communication data from the plurality of secondary servers.

3. The communication method as set forth in claim 1, wherein the secondary communication session is established between each of the plurality of secondary servers and the different ones of the passive participants for transmitting the communication data from each the plurality of secondary servers to the different ones of the passive participants.

4. The communication method as set forth in claim 3, further comprising:
    detecting, by one of the primary server and the plurality of secondary servers, a signal from a signaling passive participant of the passive participants to establish the primary communication session; and
    establishing, by the primary server, the primary communication session with the signaling passive participant in response to the detecting of the signal, whereby the signaling passive participant becomes another active participant.

5. The communication method as set forth in claim 3, wherein the predetermined event further includes a signal being detected by one of the secondary servers.

6. The communication method as set forth in claim 3, wherein the primary communication session and the secondary communication session are established via session initiation protocol.

7. The communication method as set forth in claim 3, wherein,
the application server is configured to receive a request from a requesting passive participant of the passive participants to establish the primary communication session,
the application server is configured to establish the primary communication session with the requesting passive participant in response to receiving the request, whereby the requesting passive participant becomes another active participant,
the application server is configured to signal the requesting passive participant and the primary server to indicate an establishment of the primary communication session with the requesting passive participant, and
the primary server and the plurality of secondary servers are media servers.

8. The communication method as set forth in claim 4, wherein, when the primary server establishes the primary communication session with the signaling passive participant, the secondary communication session between one of the plurality of secondary servers and the signaling passive participant is terminated.

9. The communication method as set forth in claim 1, wherein
the passive participant becomes another active participant when the primary communication session is established between the primary server and the passive participant.

10. The communication method as set forth in claim 1, wherein,
the primary server receives communication data generated by a plurality of active participants, and
the primary server mixes the communication data received from the plurality of active participants before the transmitting of the communication data to the active participant and to each of the plurality of secondary servers.

11. A primary server for transferring communication data between a plurality of participants in a communication system, the primary server comprising:
a processor; and
a memory storing instructions that, when executed by the processor, cause the processor to perform operations including:
establishing a primary communication session between the primary server and an active participant of the plurality of participants;
receiving communication data generated by the active participant of the plurality of the plurality of participants;
transmitting the communication data received from the active participant to the active participant and to each of a plurality of secondary servers that is configured to not directly receive any communication data from the plurality of participants;
determining whether a predetermined event has occurred, the predetermined event being the active participant not providing the communication data for a predetermined period of time;
terminating the primary communication session between the primary server and the active participant and establishing a secondary communication session between one of the plurality of secondary servers and the active participant when the predetermined event has occurred; and
establishing the primary communication session between the primary server and a passive participant of the plurality of participants in response to the primary server receiving a request from the passive participant while the secondary communication session is established between the passive participant and one of the plurality of secondary servers, and terminating the secondary communication session between the passive participant and the one of the plurality of secondary servers in response to the primary communication session being established, the request being an out-of-band communication,
wherein each of the plurality of secondary servers is configured to receive the communication data from the data transmitting processor, not perform mixing of the communication data, transmit the communication data to different ones of passive participants of the plurality of participants that do not generate any of the communication data, and not transmit the communication data to the active participant when the primary communication session is established between the primary server and the active participant, and
an application server determines whether the predetermined event has occurred, the application server terminating the primary communication session and establishing the secondary communication session when the predetermined event occurs.

12. The primary server as set forth in claim 11,
wherein each of the plurality of secondary servers is configured to establish the secondary communication session with the different ones of the passive participants for transmitting the communication data to the passive participants.

13. The primary server as set forth in claim 12, wherein the operations further include,
detecting a signal from a signaling passive participant of the passive participants to establish the primary communication session, and
establishing the primary communication session with the signaling passive participant in response to the signal being detected, whereby the signaling passive participant becomes another active participant.

14. The primary server as set forth in claim 11, wherein the passive participant becomes another active participant when the primary communication session is established between the primary server and the passive participant.

15. The primary server as set forth in claim 11, wherein communication data generated by a plurality of active participants is received, and the operations further include:
mixing the communication data received from the plurality of active participants before transmitting the communication data to the active participant and to each of the plurality of secondary servers.

16. A non-transitory computer-readable medium encoded with an executable computer program for transferring communication data between a plurality of participants that, when executed by a processor, causes the processor to perform operations comprising:
establishing a primary communication session between a primary server and an active participant of the plurality of participants;
receiving communication data generated by the active participant via the primary communication session; and transmitting the communication data received from the active participant to the active participant and to each of a plurality of secondary servers that is configured to not directly receive any communication data from the plurality of participants;

determining whether a predetermined event has occurred, the predetermined event being the active participant not providing the communication data for a predetermined period of time;

terminating the primary communication session between the primary server and the active participant and establishing a secondary communication session between one of the plurality of secondary servers and the active participant when the predetermined event occurs;

establishing the primary communication session between the primary server and a passive participant of the plurality of participants in response to the primary server receiving a request from the passive participant while the secondary communication session is established between the passive participant and one of the plurality of secondary servers; and terminating the secondary communication session between the passive participant and the one of the plurality of secondary servers in response to the primary communication session being established, the request being an out-of-band communication, wherein the secondary communication session is established between each of the plurality of secondary servers and different ones of passive participants of the plurality of participants that do not generate any of the communication data, and wherein each of the plurality of secondary servers receives the communication data from the primary server, does not perform mixing of the communication data, transmits the communication data to the different ones of the passive participants via the secondary communication session, and does not transmit the communication data to the active participant when the primary communication session is established between the primary server and the active participant, and an application server determines whether the predetermined event has occurred, the application server terminating the primary communication session and establishing the secondary communication session when the predetermined event occurs.

17. The non-transitory computer-readable medium as set forth in claim 16, wherein the passive participant becomes another active participant when the primary communication session is established between the primary server and the passive participant.

18. The non-transitory computer-readable medium as set forth in claim 16, wherein the executable computer program further causes the processor to perform:

detecting a signal from a signaling passive participant of the passive participants to establish the primary communication session, wherein the primary communication session is established between the primary server and the signaling passive participant in response to the detecting of the signal.

* * * * *